United States Patent
Bak et al.

(10) Patent No.: US 8,531,416 B2
(45) Date of Patent: Sep. 10, 2013

(54) LIQUID CRYSTAL DISPLAY PANEL, LIQUID CRYSTAL DISPLAY APPARATUS AND METHOD OF DRIVING THE LIQUID CRYSTAL DISPLAY APPARATUS

(75) Inventors: Dae-Yang Bak, Yongin-si (KR); Seok-Hyun Jung, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 531 days.

(21) Appl. No.: 12/842,489

(22) Filed: Jul. 23, 2010

(65) Prior Publication Data

US 2011/0074712 A1 Mar. 31, 2011

(30) Foreign Application Priority Data

Sep. 28, 2009 (KR) .............................. 2009-0091626

(51) Int. Cl.
*G06F 3/041* (2006.01)
(52) U.S. Cl.
USPC .............. 345/173; 345/55; 345/174; 345/175
(58) Field of Classification Search
USPC .............................. 345/173, 87–104, 175–178
See application file for complete search history.

(56) References Cited

U.S. PATENT DOCUMENTS

| | | |
|---|---|---|
| 2005/0094038 A1 | 5/2005 | Choi et al. |
| 2006/0146035 A1 | 7/2006 | Cha et al. |
| 2007/0200833 A1* | 8/2007 | Park et al. ..................... 345/173 |
| 2008/0048999 A1* | 2/2008 | Chiang et al. ................. 345/204 |
| 2009/0091546 A1* | 4/2009 | Joo et al. ........................ 345/173 |
| 2009/0284483 A1* | 11/2009 | Ting et al. ..................... 345/173 |
| 2010/0001970 A1* | 1/2010 | Yamashita ..................... 345/173 |
| 2010/0128207 A1* | 5/2010 | Hwang et al. ................. 349/106 |
| 2010/0259512 A1* | 10/2010 | Lin et al. ....................... 345/204 |

FOREIGN PATENT DOCUMENTS

| | | |
|---|---|---|
| JP | 2000-259349 | 9/2000 |
| JP | 2006-163745 | 6/2006 |
| JP | 2008-033265 | 2/2008 |
| KR | 1020040001324 | 1/2004 |
| KR | 1020070063263 | 6/2007 |
| KR | 1020070082959 | 8/2007 |
| KR | 1020080014296 | 2/2008 |
| KR | 1020080042294 | 5/2008 |
| KR | 1020080065463 | 7/2008 |
| KR | 1020080080800 | 9/2008 |

* cited by examiner

*Primary Examiner* — Alexander S Beck
*Assistant Examiner* — Amen Bogale
(74) *Attorney, Agent, or Firm* — F. Chau & Associates, LLC

(57) ABSTRACT

A liquid crystal display (LCD) panel includes an array substrate, an opposite substrate and a liquid crystal layer. The array substrate includes a plurality of data lines, a plurality of gate lines, a pixel electrode, a plurality of sensing lines and a touch sensing circuit. The gate lines cross the data lines. The number of the gate lines is double the number of data lines. The pixel electrode is connected to the data line and the gate line to define a pixel area. The sensing lines are formed substantially parallel to the data lines. The touch sensing circuit is electrically connected to adjacent gate lines in a forming direction of the data line and the sensing line, a sensing line for touch position detection being formed in one line direction. such that an aperture ratio of an LCD panel is increased.

20 Claims, 11 Drawing Sheets

1/2H OVERLAPPNG DRIVING

LIQUID CRYSTAL DISPLAY PANEL, LIQUID CRYSTAL DISPLAY APPARATUS AND METHOD OF DRIVING THE LIQUID CRYSTAL DISPLAY APPARATUS

CROSS-REFERENCE TO RELATED APPLICATION

This application claims under 35 U.S.C. §119 priority to and the benefit of Korean Patent Application No. 2009-91626, filed on Sep. 28, 2009 in the Korean Intellectual Property Office (KIPO), the entire content of which is incorporated by reference herein.

BACKGROUND OF THE INVENTION

1. Technical Field

The present disclosure relates to display devices, and, more particularly, to a liquid crystal display (LCD) panel, an LCD apparatus and a method of driving the LCD apparatus.

2. Discussion of the Related Art

An LCD apparatus typically includes two substrates and a liquid crystal layer interposed between the two substrates to display images using optical and electrical properties of liquid crystal, such as anisotropic refractive index, anisotropic dielectric constant, and the like. When electric fields are applied to the liquid crystal layer, an arrangement of the liquid crystal layer is altered to control optical transmittance through the liquid crystal layer such that an image is displayed.

The LCD apparatus includes a plurality of switching elements and a plurality of signal lines. The switching elements are respectively connected to pixel electrodes formed in a matrix shape. The signal lines include a plurality of gate lines for respectively activating the switching elements and a plurality of data lines for applying a voltage to the pixel electrode. Conventionally, the number of gate lines is equal to the number of the pixel electrodes arranged in a vertical direction, and the number of data lines is equal to that of the pixel electrodes arranged in a horizontal direction. Recently, research for decreasing the number of wirings in an LCD apparatus has been ongoing. For example, a structure in which the number of data lines is decreased to half has been developed. That is, an LCD apparatus has been developed, in which the number of data lines is half in comparison with a conventional LCD apparatus and the number of gate lines is twice as many as a conventional LCD apparatus.

Moreover, an LCD apparatus having a touch panel has been used in various fields to input a request of the user by having an icon displayed on a screen of the LCD apparatus. The touch panel detects a contact position of a finger or an object, and provides information corresponding to the contact position as an input signal to drive the LCD apparatus. The LCD apparatus having the touch panel does not require an additional input apparatus such as a key pad. As such, the LCD apparatus having the touch panel has been widely used as a portable electric apparatus.

In the LCD apparatus having the touch panel, the thickness and size thereof have increased. Thus, research for integrally forming the touch panel on the LCD apparatus has been ongoing. However, when the touch panel is integrally formed on the LCD apparatus, a plurality of sensing lines is formed, such that the aperture ratio thereof is decreased and light transmittance is decreased.

SUMMARY OF THE INVENTION

An exemplary embodiment of the present invention provides an LCD panel having a touch screen function in which the number of needed sensing lines is decreased.

An exemplary embodiment of the present invention also provides an LCD apparatus having the above-mentioned LCD panel.

An exemplary embodiment of the present invention further provides a method of driving the above-mentioned LCD apparatus.

According to an exemplary embodiment of the present invention, a liquid crystal display panel includes an array substrate including a plurality of data lines, a plurality of gate lines that cross the data lines, a number of the gate lines being twice as many as a pixel resolution along a direction in which the data lines are formed, a pixel electrode connected to a data line and to a gate line to provide a respective pixel area; a plurality of sensing lines formed substantially parallel with the data lines, and a touch sensing circuit electrically connected to adjacent gate lines and the sensing lines, the adjacent gate lines being between the pixel electrodes adjacent to each other in a direction of the data lines. An opposite substrate is opposite to the array substrate, the opposite substrate having connection members that protrude and are spaced apart from the array substrate by a predetermined interval. A liquid crystal layer is disposed between the array substrate and the opposite substrate.

The touch sensing circuit may include a first sensing electrode that electrically connects to a connection member when an external impact is applied to the connection member, a second sensing electrode electrically connected to the first sensing electrode, a third sensing electrode separated from the first sensing electrode and the second sensing electrode and electrically connectable to the second sensing electrode, a first switching element comprising a first terminal electrically connected to a (k+1)-th gate line, 'k' being a natural number, the first switching element being turned on in response to a gate signal of a k-th gate line, and a second switching element electrically connected to the second sensing electrode and to the third sensing electrode to switch between the second sensing electrode and the third sensing electrode in response to a signal of a second terminal of the first switching element.

The sensing lines and the data lines may be formed from a substantially same layer.

The liquid crystal display panel may further include an interval maintaining member disposed between the array substrate and the opposite substrate to maintain a predetermined interval of the array substrate and the opposite substrate.

The liquid crystal display panel may further include a common electrode formed on pixel areas and isolated from the pixel electrode by the liquid crystal layer. The common electrode may be electrically connected to the connection members such that a voltage potential of the common electrode is substantially equal to a voltage potential of the connection member.

The first sensing electrode, the second sensing electrode, the third sensing electrode and the pixel electrode may be formed from a substantially same layer.

The first switching element and the second switching element may each be a field effect transistor.

The opposite substrate may include a black matrix disposed between the pixel electrodes in a same direction as the data lines, the black matrix comprising an opaque material to prevent light leakage.

The black matrix may overlap with the sensing lines.

According to an exemplary embodiment of the present invention liquid crystal display apparatus includes a liquid crystal display panel having an array substrate that includes a plurality of data lines, a plurality of gate lines that cross the data lines, a number of the gate lines being twice as many as a pixel resolution along a direction in which the data lines are formed, a pixel electrode connected to a data line and to a gate line to define a respective pixel area, a plurality of sensing lines formed substantially parallel with the data lines, and a touch sensing circuit electrically connected to adjacent gate lines and the sensing lines. the adjacent gate lines being between the pixel electrodes adjacent to each other in a direction of the data lines. An opposite substrate is opposite to the array substrate, the opposite substrate having connection members that protrude and are spaced apart from the array substrate by a predetermined interval. A liquid crystal layer is disposed between the array substrate and the opposite substrate. A gate driver sequentially outputs a plurality of gate signals to the gate lines such that portions of one horizontal period of adjacent gate signals overlap with each other. A touch position detector detects a position coordinate at which the external impact is applied.

The liquid crystal display apparatus may further include a timing controller that receives a primary data signal and a control signal from an external device to control the liquid crystal display panel, a power provider that outputs an initial driving voltage and an analog driving voltage to the liquid crystal display panel and that outputs a gate on/off voltage to the gate line, in response to a control signal output from the timing controller, a gradation voltage generator that outputs a plurality of reference gradation voltages that correspond to an number of gradations using the analog driving voltage as a reference voltage provided from the power provider, and a data driver that converts the data signal provided in a line unit into a data voltage, based upon a control signal output from the timing controller and the gradation voltage output from the gradation voltage generator, and that outputs the data voltage to the data lines. The gate driver generates the gate signal in response to a control signal output from the timing controller and a gate on/off voltage output from the power provider.

The touch sensing circuit may further include a first sensing electrode that electrically connects to the connection member when an external impact is applied thereto, a second sensing electrode electrically connected to the first sensing electrode, a third sensing electrode separated from the first sensing electrode and the second sensing electrodes and electrically connectable to the second sensing electrode, a first switching element that includes a first terminal electrically connected to a (k+1)-th gate line. 'k' being a natural number, the first switching element being turned on in response to a gate signal of a k-th gate line, and a second switching element electrically connected to a second sensing electrode and to a third sensing electrode to switch between the second sensing electrode and the third sensing electrode in response to a signal of a second terminal of the first switching element.

The liquid crystal display apparatus may further include a common electrode isolated from the pixel electrode by the liquid crystal layer interposed between the common electrode and the pixel electrode. The common electrode may be electrically connected to the connection member such that a voltage potential of the common electrode is substantially equal to a voltage potential of the connection member.

Voltages applied to the pixel electrodes may be different from each other by frames with respect to a voltage potential of the common electrode.

The gate driver may be disposed within the liquid crystal display. panel.

The gate driver may include amorphous silicon.

The gate driver may be formed at two end portions of the liquid crystal display panel interposed between the two end portions.

A period in which the adjacent gate signals overlap with each other may be about one half a horizontal period.

According to an exemplary embodiment of the present invention a method of driving a liquid crystal display apparatus is provided. A plurality of gate signals is sequentially outputted to a plurality of gate lines such that portions of one horizontal period of adjacent gate signals overlap with each other. A connection member that protrudes from an opposite substrate towards an array substrate is connected to a first sensing electrode when an external impact is applied to an upper portion of an opposite substrate. the connection member being separated from an array substrate. A touch signal is delivered from the first sensing electrode to a sensing line during an overlapping interval in which the adjacent signals overlap with each other. when a touch is generated by the external impact. A position coordinate of a position to which the external impact is applied is detected.

The first sensing electrode may be in a touch detection sensing circuit, and delivering the touch signal to the sensing line may further include delivering a touch signal to a second sensing electrode of the touch detection circuit electrically connected to the first sensing electrode, turning on a first switching element when an active signal is applied to a k-th gate line of the gate lines, being a natural number no more than the number of gate lines. delivering an active signal of the (k+1)-th gate line from a first terminal of the first switching element to a second terminal of the first switching element, when an active signal is applied to an (k+1)-th gate line electrically connected to the first terminal of the first switching element, turning on a second switching element connected to a second sensing electrode of the touch detection sensing circuit and a third sensing electrode of the touch detection sensing circuit, when an active signal is applied to a second terminal of the first switching element, delivering the touch signal delivered to the second sensing electrode through the second switching element to the third sensing electrode, and delivering the touch signal to the sensing line electrically connected to the third sensing electrode.

BRIEF DESCRIPTION OF THE DRAWINGS

The features of the exemplary embodiments of the present invention will become more apparent by the following description with reference to the accompanying drawings, in which.

DETAILED DESCRIPTION OF THE EXEMPLARY EMBODIMENTS

Figure 1:
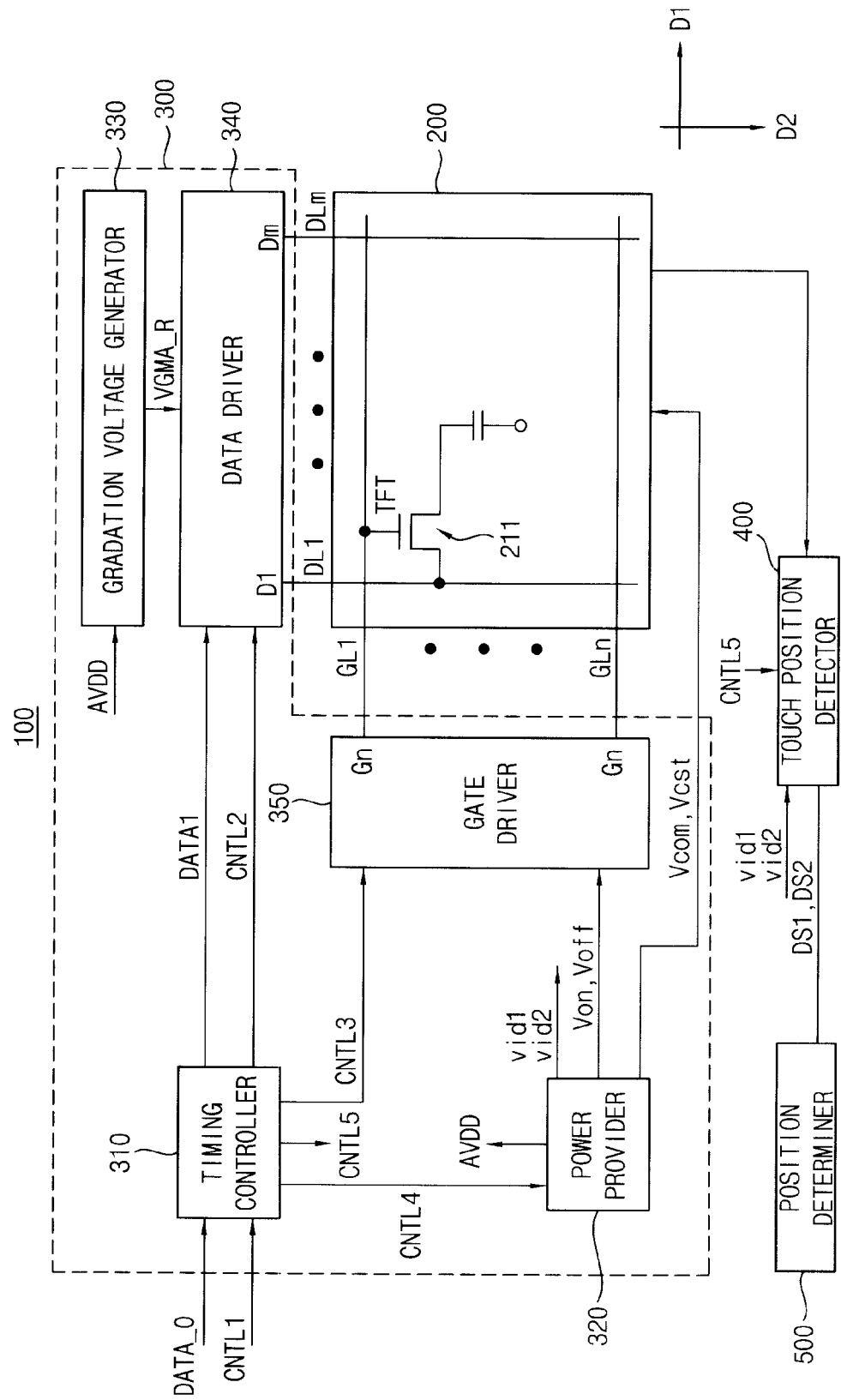
FIG. 1 is a block diagram illustrating an LCD apparatus according to an exemplary embodiment of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. In the drawings, the sizes and relative sizes of layers and regions may be exaggerated for clarity. Like numerals refer to like elements throughout.

It will be understood that when an element or layer is referred to as being "on," "connected to" or "coupled to" another element or layer, it can be directly on, connected or coupled to the other element or layer or intervening elements or layers may be present.

Figure 2:
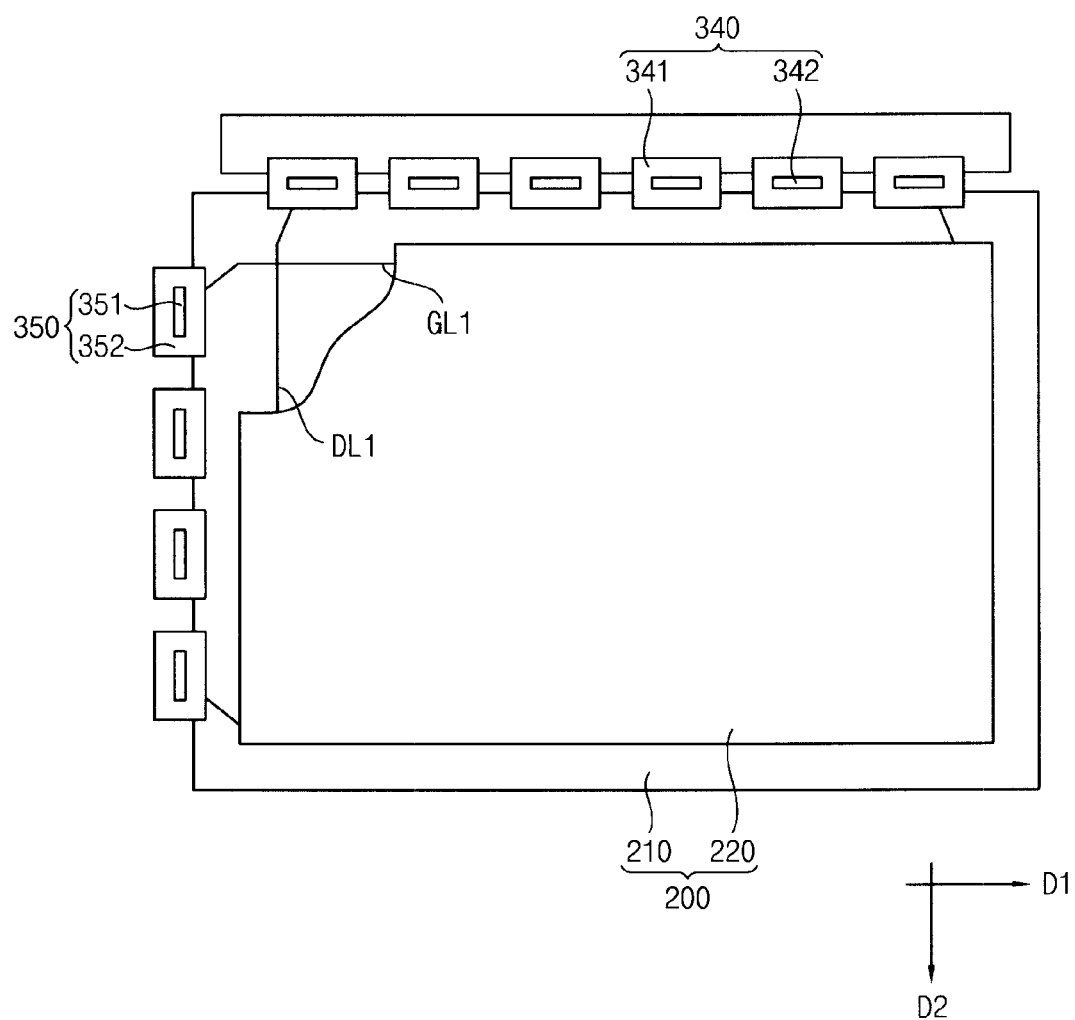
FIGS. 2, 3 and 4 are plan views illustrating exemplary embodiments of the LCD panel of FIG. 1.

FIG. 1 is a block diagram illustrating LCD apparatus 100 according to an exemplary embodiment of the present invention. FIG. 2 is a plan view illustrating an exemplary embodiment of the LCD panel of FIG. 1. The LCD apparatus 100 includes an LCD panel 200, a panel driver 300, a touch position detector 400 and a position determiner 500.

The LCD panel 200 includes an array substrate 210 in which a plurality of thin-film transistors (TFTs) is formed, an opposite substrate 220 opposite to the array substrate 210, and a liquid crystal layer interposed between the array substrate 210 and the opposite substrate 220.

A plurality of gate lines GL and a plurality of data lines DL are formed on the array substrate 210. The gate lines GL are arranged in a first direction D1, and the data lines DL are arranged in a second direction D2. The first direction D1 and the second direction D2 cross each other. For example. n gate lines GL1, . . . , GLn that extend in the first direction D1 are formed on a base substrate of the array substrate 210, and m data lines DL1, . . . , DLm that extend in the second direction D2 are also formed on the base substrate of the array substrate 210. In this case, 'n' and 'm' are natural numbers. Pixels are formed on the array substrate of the array substrate 210 at crossing areas where the gate lines and the data lines cross each other.

Moreover, a thin-film transistor (TFT) 211, that is a switching element, and a pixel electrode are formed at the respective crossing areas. A gate electrode of the TFT 211 is connected to the first gate line GL1, a source electrode of the TFT 211 is connected to the first gate line DL1, and a drain electrode of the TFT 211 is connected to the pixel electrode. Similarly, a TFT and a pixel electrode are formed at the crossing area in which m-th data line DLm and n-th gate line GLn cross each other. Furthermore, a common electrode is formed at the crossing area, such that the common electrode and the pixel electrode define a capacitor.

The opposite substrate 220 is disposed opposite to the array substrate 210 and is coupled with the array substrate 210. Thus, the opposite substrate 220 and the array substrate 210 can receive the liquid crystal layer. The opposite substrate 220 may be a color filter substrate in which a plurality of color filters corresponding to each pixel is formed. Alternatively, the color filters may be formed on the array substrate 210.

The panel driver 300 includes a timing controller 310, a power provider 320, a gradation voltage generator 330, a data driver 340 and a gate driver 350.

The timing controller 310 controls the operation of the LCD apparatus 100. The timing controller 310 receives primary data DATA_O such as red (R) data, green (G) data and blue (B) data and a first control signal CNTL1 from a graphic controller (not shown), and outputs a first data signal DATA1, a second control signal CNTL2, a third control signal CNTL3 and a fourth control signal CNTL4 for displaying an image on the LCD panel 200.

For example, the first control signal CNTL1 includes a main clock signal (MCLK), horizontal synchronizing signal (HSYNC), and a vertical synchronizing signal (VSYNC). The vertical synchronizing signal (Vsync) represents the time required for displaying one frame. The horizontal synchronizing signal (Hsync) represents the time required for displaying one line of the frame. Thus, the horizontal synchronizing signal includes pulses corresponding to the number of pixels included in one line. The second control signal CNTL2 includes a horizontal start signal (STH) which controls the data driver 340, an inversion signal (REV), and a data load signal (TP). The third control signal CNTL3 includes a vertical start signal (STV), a clock signal (CK), and an output enable signal (OE). The fourth control signal CNTL4 includes a clock signal (CLK), and an inversion signal (REV).

The timing controller 310 controls an outputting timing of the primary data signal DATA_O to provide the data driver 340 with a first data signal DATA1.

The timing controller 310 further outputs a fifth control signal CNTL5 which controls the touch position detector 400. The fifth control signal CNTL5 includes a clock signal which provides control such that first and second initial driving voltages Vid1, Vid2 output from the power provider 320 are provided to a first sensing line SL1 and a second sensing line SL2, respectively. The first and second initial driving voltages Vid1, Vids2 may be at ground level. In this case, the fifth control signal CNTL5 includes a clock signal for the remaining initial driving voltage.

The power provider 320 outputs common voltages Vcom, Vst provided to the array substrate 210, the first and second initial driving voltages Vid1, Vid2 provided to the array substrate 210, an analog driving voltage, AVDD provided to the gradation voltage generator 330, and gate on/off voltages provided to the gate driver 350, in response to the fourth control signal CNTL4 outputted from the timing controller 310. The first and second initial driving voltages Vid1, Vid2, the analog driving voltage AVDD and the gate on/off voltages may be provided to the gate driver 350 to perform a touch screen function.

The gradation voltage generator 330 outputs a plurality of reference gradation voltages VGMA_R corresponding to the number of gradation levels by using the analog driving voltage AVDD provided from the power provider 320 as a reference voltage.

The data driver 340 may include a data tape carrier package (TCP) 341. The data driver 340 may be mounted on the LCD panel 200. The data driver 340 converts the first data signal DATA1 of a digital type provided in a line unit into a plurality of data signals D1 . . . Dm based upon the second control signal CNTL2 and the gradation voltage VGMA_R outputted from the gradation voltage generator 330. The data driver 340 controls an output timing of the data signals D1, . . . , Dm to output the data signals D1, . . . , Dm to the data lines DL1, . . . , DLm.

The gate driver 350 may include a gate TCP 352 having a gate driver chip 351. The gate driver 350 may be formed on the LCD panel 200. As described below regarding FIG. 4, the gate driver 350 may he disposed at two sides of the LCD panel 200. In this case, the gate driver 350 may be formed in an interior portion of the LCD panel 200 or an exterior portion of the LCD panel 200. The gate driver 350 generates a plurality of gate signals G1, . . . , Gn in response to the gate on/off voltages Von, Voff outputted from the power provider 320, and sequentially outputs the gate signals G1, . . . , Gn to the gate lines GL1, . . . GLn.

Figure 5:
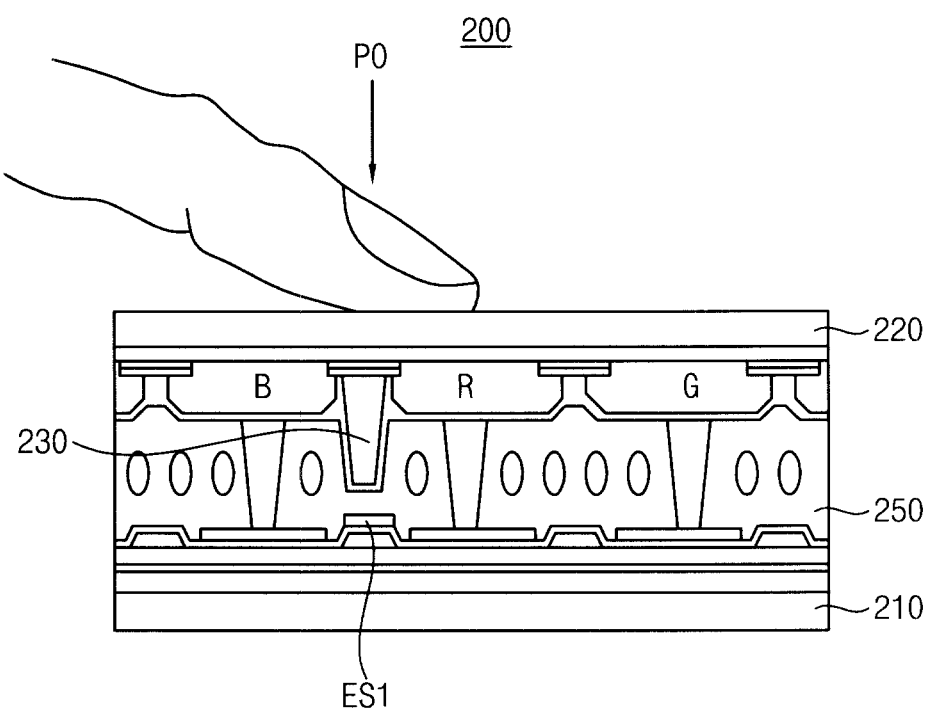
FIG. 5 is a cross-sectional view illustrating an LCD panel according to an exemplary embodiment of the present invention.

Referring to FIG. 5, when an external impact PO is applied to an upper portion of the opposite substrate 220, the touch position detector 400 shown in FIG. a detects a position coordinate of a point to which the external impact PO is applied. The touch position detector 400 includes a data sampler that detects a variation of the first and second initial driving voltages Vid1, Vid2 to output a first detection signal DS1 and a second detection signal DS2, respectively, to position determiner 500.

In this case, the touch position detector 400 may be formed in the data driver 340 included in the panel driver 300. In an exemplary embodiment, the touch position detector 400 may be formed in an interior portion of a data driving chip 342 included in the data driver 340 as shown in FIG. 2. In this case, a plurality of pads that are electrically connected to the first and second sensing lines SL1, SL2 may be formed within the data driving chip 342.

The position determiner 500 combines a position coordinate of a second direction D2 and a position coordinate of a first direction D1 to determine a position of the external impact PO that is applied to the LCD panel 200. The position coordinate of the second direction D2 is determined by the first detecting signal DS1, and the position coordinate of the first direction D1 is determined by the second detecting signal DS2.

Figure 3:
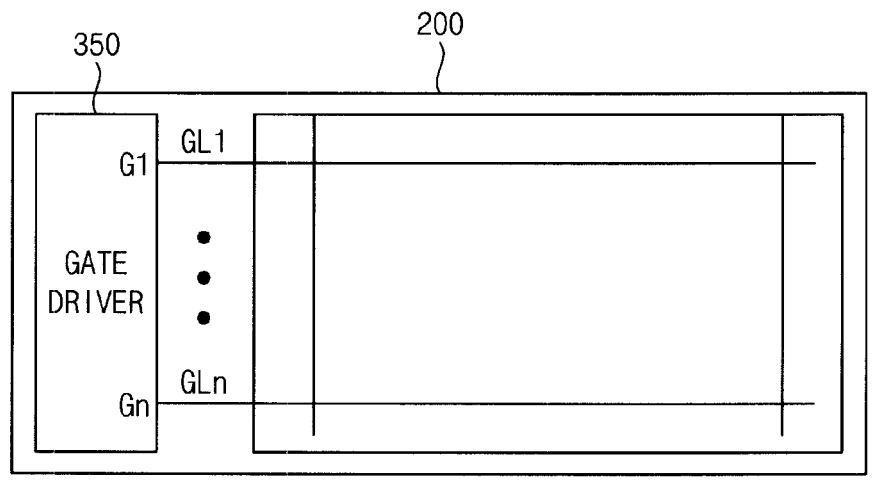

FIG. 3 is a plan view illustrating an exemplary embodiment of the LCD panel 200 of FIG. 1. The gate driver 350 may be formed within an interior portion of the LCD panel 200. In this case, the gate driver 350 may include amorphous silicon (a-Si) to be directly mounted on the LCD panel 200.

Figure 4:
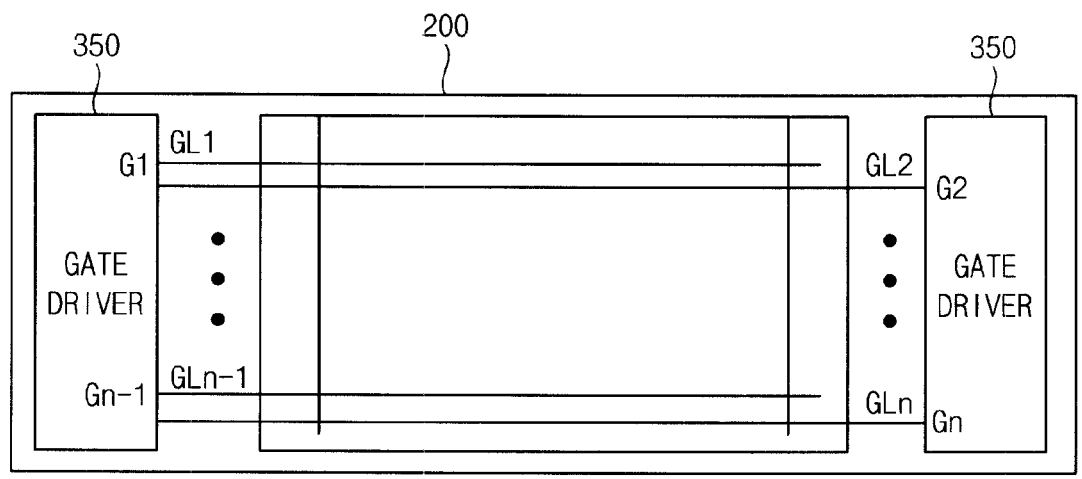

FIG. 4 is a plan view illustrating an exemplary embodiment of the LCD panel 200 of FIG. 1. The gate driver 350 may be formed at two portions of the LCD panel 200, such that one part of the gate driver 350 is opposite to another part of the gate driver 350 by interposing a display area corresponding to a screen of the LCD panel 200. In this case, the gate driver 350 may include amorphous silicon to be directly integrated on the LCD panel 200.

Referring back to FIG. 5, the cross-sectional view illustrates an LCD panel according to an exemplary embodiment of the present invention. The LCD panel 200 includes an array substrate 210 on which a pixel electrode is formed, an opposite substrate 220 on which a common electrode is formed to be opposite to the array substrate 210 and a liquid crystal layer 250 interposed between the array substrate 210 and the opposite substrate 220. When the LCD panel 200 is an LCD panel for a touch screen, the LCD panel 200 may further include a connection member 230 disposed between the array substrate 210 and the opposite substrate 220, and a first sensing electrode ES1 formed on the array substrate 210. The connection member 230 is shifted by the external impact PO applied at an upper portion thereof such that the connection member 230 gets connected to the first sensing electrode ES1. In this case, a sensing position can be measured.

Figure 6:
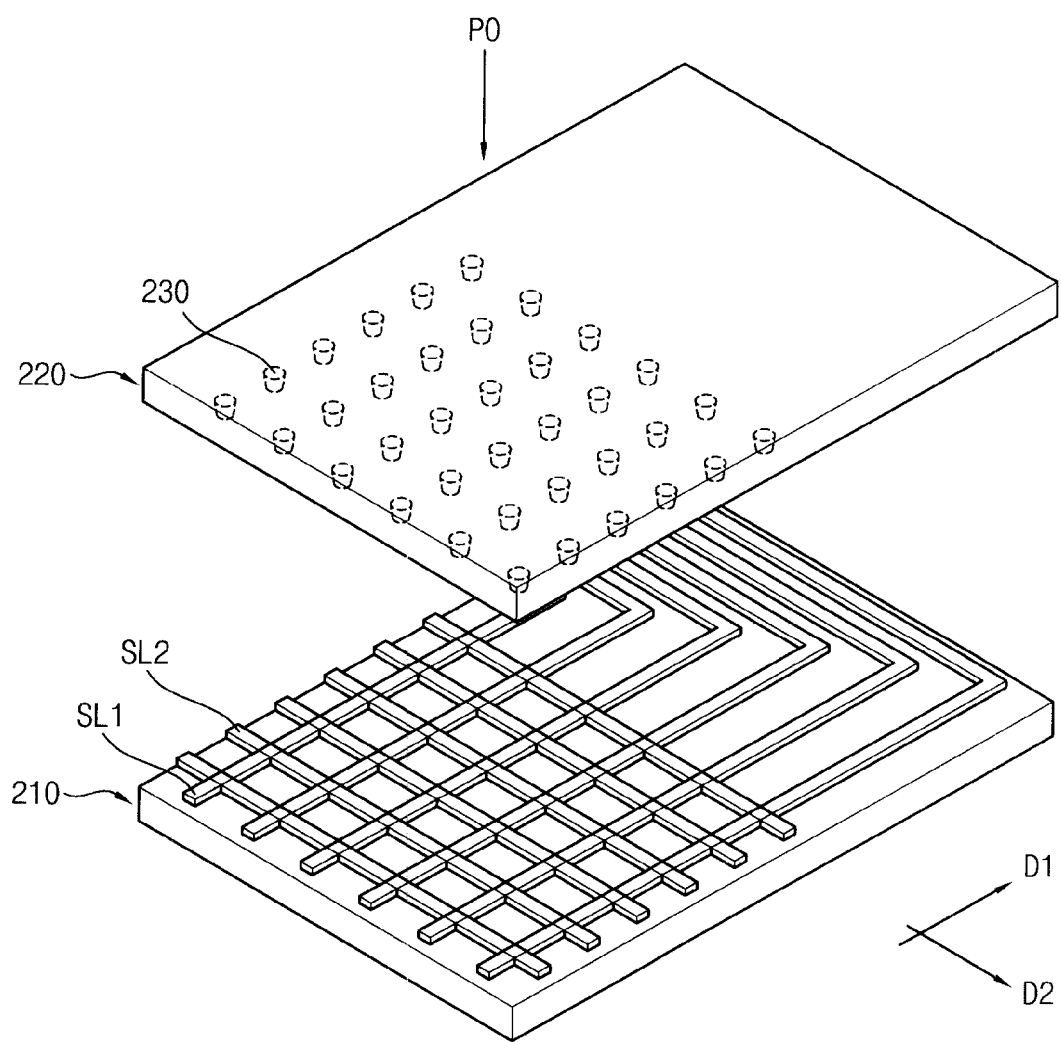
FIG. 6 is a perspective view illustrating an LCD panel for a conventional touch screen.

FIG. 6 is a perspective view illustrating an LCD panel for a conventional touch screen. Connection members 230 for performing a touch screen function are formed on the opposite substrate 220. Each of the connection members 230 becomes electrically connected to a first sensing electrode ES1 formed on the array substrate 210 in response to an external impact PO applied from an upper portion thereof.

Moreover, a plurality of sensing lines SL1 and a plurality of sensing lines SL2 are formed on the array substrate 210 in order to perform a touch screen function. The first sensing lines SL1 extend in the first direction D1, and the second sensing lines SL2 extend in the second direction D2. The first sensing lines SL1 and the second sensing lines SL2 are electrically isolated from each other. The first sensing lines SL1 and the second sensing lines SL2 cross each other. The first and second sensing lines SL1, SL2 are connected to the touch position detector 400 as shown in FIG. 1.

In an exemplary embodiment, the first and second sensing lines SL1, SL2 may be formed for every unit pixel in which pixels displaying red, green and blue or other colors are configured. In an exemplary embodiment, the first and second sensing lines SL1, SL2 may be formed for every unit pixel having a predetermined number of pixels.

Figure 7:
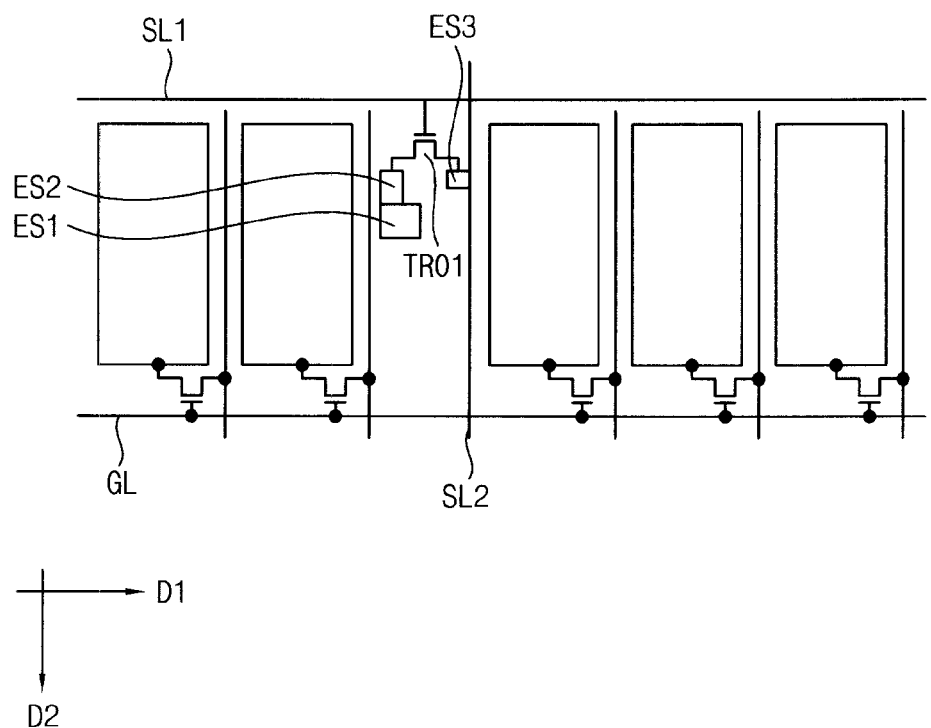
FIG. 7 is a plan view partially illustrating a portion of the LCD panel for the conventional touch screen of FIG. 6.

FIG. 7 is a plan view partially illustrating a portion of the LCD panel for the conventional touch screen of FIG. 6. When the connection member 230 is connected to the first sensing electrode ES1 by an external impact PO applied from an upper portion thereof, an electric potential of the second sensing electrode ES2 connected to the first sensing electrode ES1 is substantially equal to that of the first sensing electrode ES1. In this case, the second sensing electrode ES2 is electrically connected to a third sensing electrode ES3 at a time when a scan signal for turning on a transistor TR01 for a sensing scan is applied to a first sensing line SL1, such that an electric potential of the second initial driving voltage Vid2 of a second sensing line SL2 is varied. The variation of the electric potential is detected to determine a position of the external impact PO. A signal is sequentially applied to the first sensing line SL1 in a predetermined timing, such that the first sensing line SL1 is used to determine a coordinate of a second direction D2 corresponding to a position of the external impact PO. Moreover, the second sensing line SL2 may be used to determine a coordinate of a first direction D1. The connection members are formed on a predetermined area of the opposite substrate 220 in correspondence with an area where the first and second sensing lines are formed thereon.

In an exemplary embodiment, the connection members may be formed for every unit pixel in which pixels displaying red, green and blue or other colors are configured. In an exemplary embodiment, the connection members may be formed for every unit pixel having a predetermined number of pixels.

Figure 8:
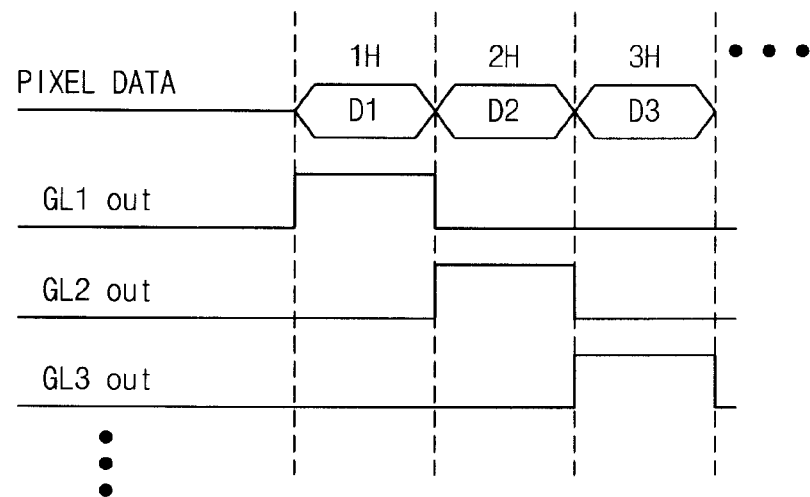
FIG. 8 depicts waveform diagrams showing the data signals and the gate signals of the LCD apparatus having an LCD panel for the touch screen of FIG. 6.

FIG. 8 depicts waveform diagrams showing data signals and gate signals of the LCD apparatus including the LCD panel for the touch screen of FIG. 6. A gate on signal is applied to a first gate line GL1 for 1H (1 horizontal period), and data voltages are applied to pixels corresponding to a horizontal direction for the 1H. Similarly, gate on signals are sequentially applied to a second gate line GL2 to n-th gate line GLn for 1H, and data voltages are respectively applied to pixels for each 1H. Accordingly, while a gate on signal is delivered to one gate line, a gate off signal is delivered to the remaining gate lines.

Figure 9:
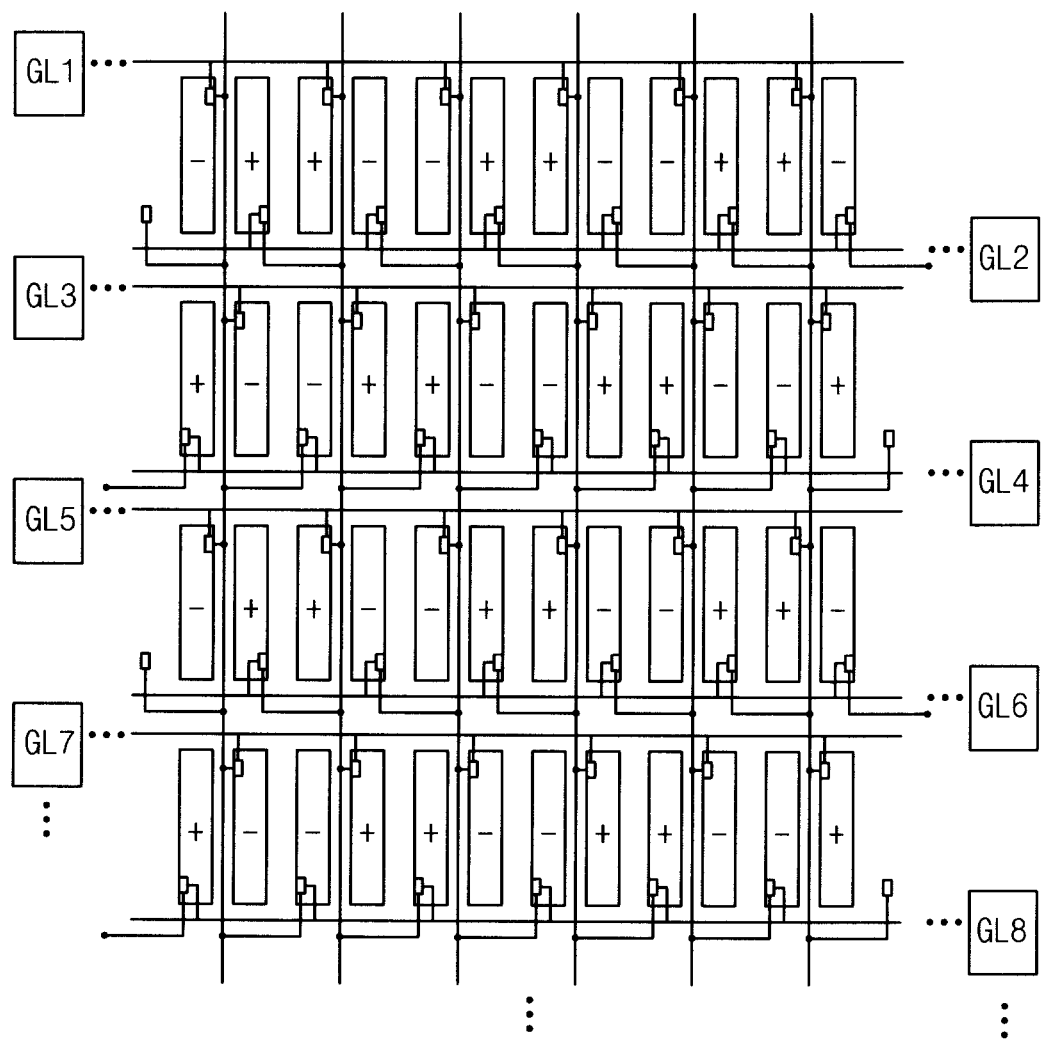
FIG. 9 is a plan view illustrating a portion of the LCD apparatus of FIG. 1.

FIG. 9 is a plan view illustrating a portion of the LCD apparatus of FIG. 1. Displaying a polarity on a pixel in plus/minus (+/−) represents that a polarity of data voltage with respect to a common voltage by each frame, and represents that polarities between adjacent pixels are different from each other in every frame. The common voltage is applied to a counter electrode of a pixel electrode by interposing a liquid crystal layer, such that each of the pixels transmits light due to a voltage difference between the common voltage and each data voltage that is applied to the pixel electrode. Moreover, the common voltage may be applied to the connection member 230, such that a variation between a voltage potential of the second sensing line and the second initial driving voltage Vid1 may be sensed.

As shown in FIG. 9, the gate lines GL1-GL8 according to an exemplary embodiment of the present invention are disposed at an upper portion of the pixel and at a lower portion of the pixel in accordance with a pixel of one row direction, respectively. Thus, the number of the gate lines according to the exemplary embodiment is twice in comparison with the case that the gate lines are disposed at one of the upper portion of the pixel and the lower portion of the pixel. Moreover, in this case, the number of the data lines according to the present embodiment is half in comparison with the case that the gate lines are disposed at one of upper portion of the pixel and a lower portion of the pixel.

In the exemplary embodiment, the switching element 211 performs a switching operation due to a voltage level of the gate lines to apply a voltage of the data lines DL1-DLm to each of the pixels. In this case, each of the data lines delivers a data voltage to 2n pixels (wherein, 'n' is a natural number). Thus, according to the structure, an applying timing of a signal applied to each of the gate lines GL1-GLn and the data lines DL1-DLm may be different from an applying timing of signal applied to a conventional LCD panel in which one pixel corresponds to one gate line and one data line (which is sometimes referred to as '1D1G structure').

Figure 10:
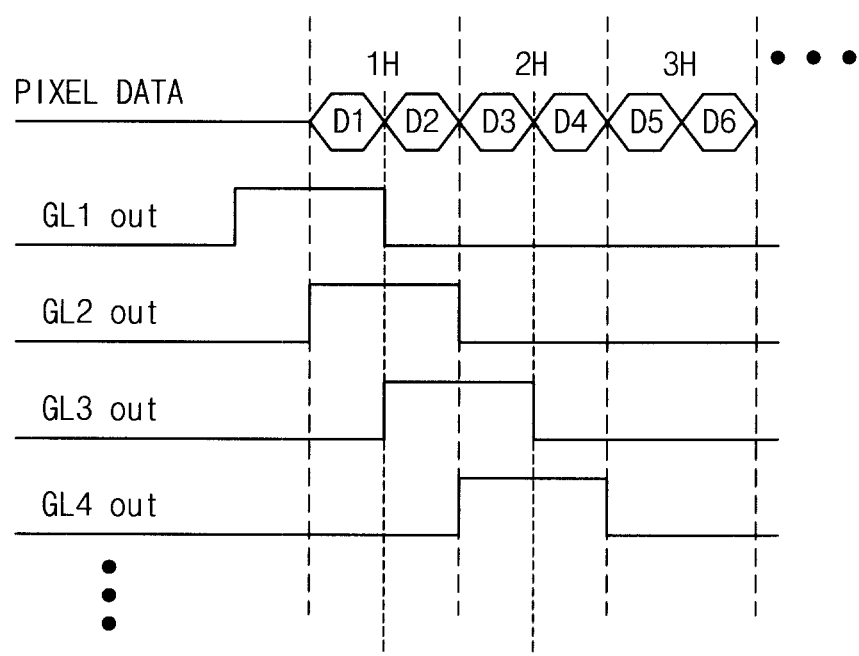
FIG. 10 depicts waveform diagrams showing the data signals and the gate signals of the LCD apparatus of FIG. 9.

FIG. 10 depicts waveform diagrams showing data signals and gate signals of the LCD apparatus of FIG. 9. According to the exemplary embodiment, the number of gate lines is increased by twice and the number of data lines is decreased by a half, such that twice data voltages are delivered to pixels for a period in which a gate on signal is applied to each gate line. In this case, a leading ½ interval of the gate on signal delivered to each gate line may be used as a pre-charge interval for charging the data voltage to the pixels.

Figure 11:
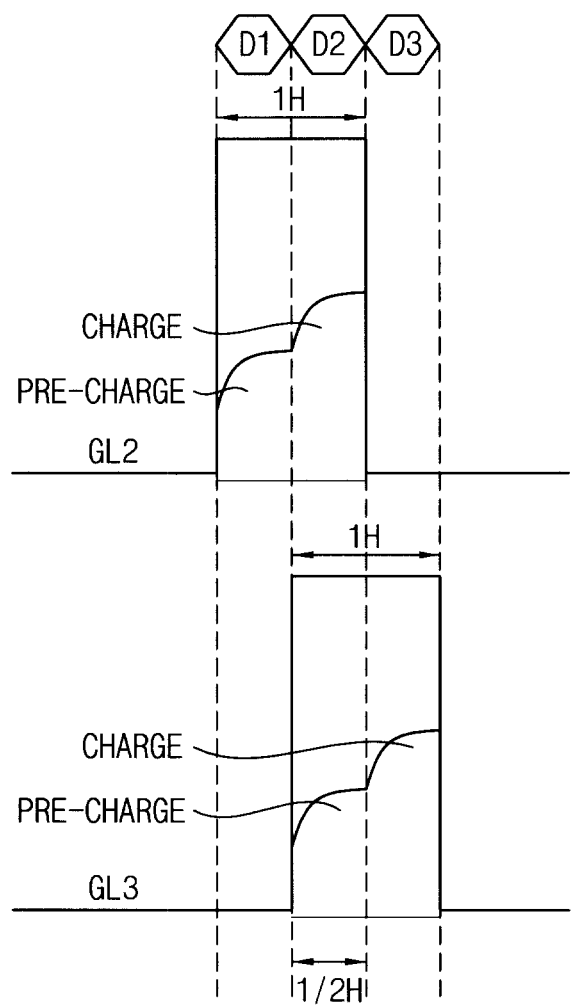
FIG. 11 depicts waveform diagrams showing a partial interval of the data signals and gate signals FIG. 10.

FIG. 11 depicts waveform diagrams showing a partial interval of data signals and gate signals FIG. 10. In FIG. 11, the operation in which data voltages are respectively applied to a second gate line GL2 and a third gate line GL3 is described. However, a voltage applying operation between gate lines that are adjacent to each other may be identical to each other.

Referring to FIG. 11, during a leading ½ interval of 1H in which gate on voltage is applied to a second gate line GL2, a first data D1 is pre-charged in each pixel. Furthermore, during an overlapping ½ interval of 1H in which the gate on voltage is applied to the second gate line GL2, the second data D2 is applied to each pixel such that each of the pixels reaches a predetermined display level. That is, a screen of the LCD apparatus is viewed by data voltages D1-D2n that are delivered to the pixels during an overlapping ½ interval of the gate on signal. Thus, in the exemplary embodiment, the gate on interval which is applied to a predetermined gate line and a gate on interval which is applied to an adjacent gate line may be temporally overlapped by a ½ interval.

Figure 12A:
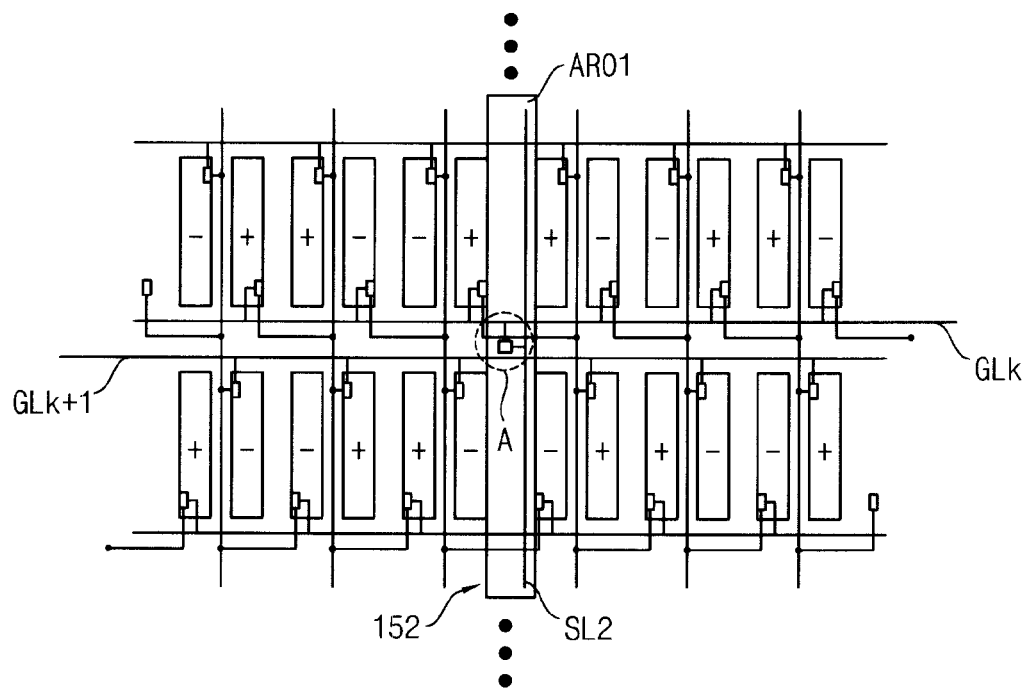
FIG. 12A is a plan view illustrating a portion of the LCD apparatus of FIG. 9 in which a circuit for touch sensing is formed.
Figure 12B:
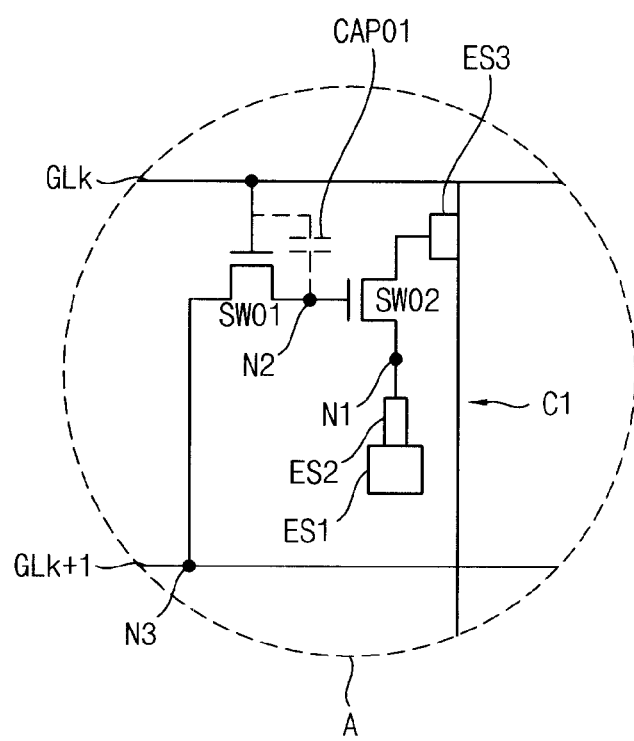
FIG. 12B is an enlarged view showing the portion "A" in FIG. 12A.

FIG. 12A is a plan view illustrating a portion of the LCD apparatus of FIG. 9 in which a circuit for touch sensing C1 is formed. FIG. 12B is an enlarged view showing a portion "A" in FIG. 12A. A first sensing line SL1, which is essentially formed on the LCD panel of FIG. 7 to realize a touch screen function, is not formed on the LCD apparatus according to the exemplary embodiment. Moreover, the transistor TR01 for a sensing scan which connects to the second sensing electrode ES2 and the third sensing electrode ES3 is removed from the LCD panel of FIG. 7, and a first touch sensing switching element SW01 and a second touch sensing switching element SW02 are added in order to use a signal of a k-th gate line GLk ('k' being a natural number no more than 'n') and a signal of a (k+1)-th gate line GLk+1 in a sensing of a touch coordinate, as shown in FIGS. 12A and 12B. For convenience of description, a field effect transistor (FET) is described in FIGS. 12A and 12B.

Referring again to FIGS. 12A and 12B, the LCD panel according to the exemplary embodiment includes a touch sensing circuit C1 not a first sensing line. The touch sensing circuit C1 includes a first touch sensing switching element SW01, a second touch sensing switching element SW02, a first switching electrode ES1, a second touch sensing electrode ES2 and a third switching electrode ES3. The LCD panel according to the exemplary embodiment further includes a plurality of wirings or a connection structure, which connects the switching elements SW01, SW02.

In an exemplary embodiment, a third node N3 of a first touch detection switching element SW01 is connected to (k+1)-th gate line GLk+1, and a second node N2 of the first touch detection switching element SW01 is electrically connected to the (k+1)-th gate line GLk+1 when an active signal is applied from the k-th gate line GLk.

Moreover, a second touch detection switching element SW02 is configured by two nodes connected to a second sensing electrode ES2 and a third sensing electrode ES3. That is, the second touch detection switching element SW02 includes a first node N1 connected to the second sensing electrode ES2 and another node connected to the third sensing electrode ES3.

In this case, the second touch detection switching element SW02 electrically connects to a second sensing electrode ES2 and a third sensing electrode ES3 when an active signal is applied from the third node N3 connected to the (k+1)-th gate line to a second node N2. That is, when active signals are applied from the k-th gate line GLk and the (k+1)-th gate line GLk+1, an active signal corresponding to the (k+1)-th gate line is delivered from the third node N3 to the second node N2. In this case, the second touch detection switching element SW02 electrically connects the second sensing electrode ES2 and the third sensing electrode ES3.

A capacitor CAP01 may be connected between a control electrode of the first touch detecting switching element SW01 and a control electrode of the second touch detection switching element SW02.

Moreover, a black matrix 152 may be formed on the opposite substrate 220 of the LCD panel 200 in a direction of a data line. The black matrix 152 may include an opaque material to be disposed between pixels to prevent light leakage. The black matrix 152 may he extended in a second direction D2. In FIG. 12A, the reference numeral "AR01" is a space between the pixels on which the black matrix will be formed. In this case, the second sensing SL2 may he formed as a black matrix of the LCD panel.

Figure 13:
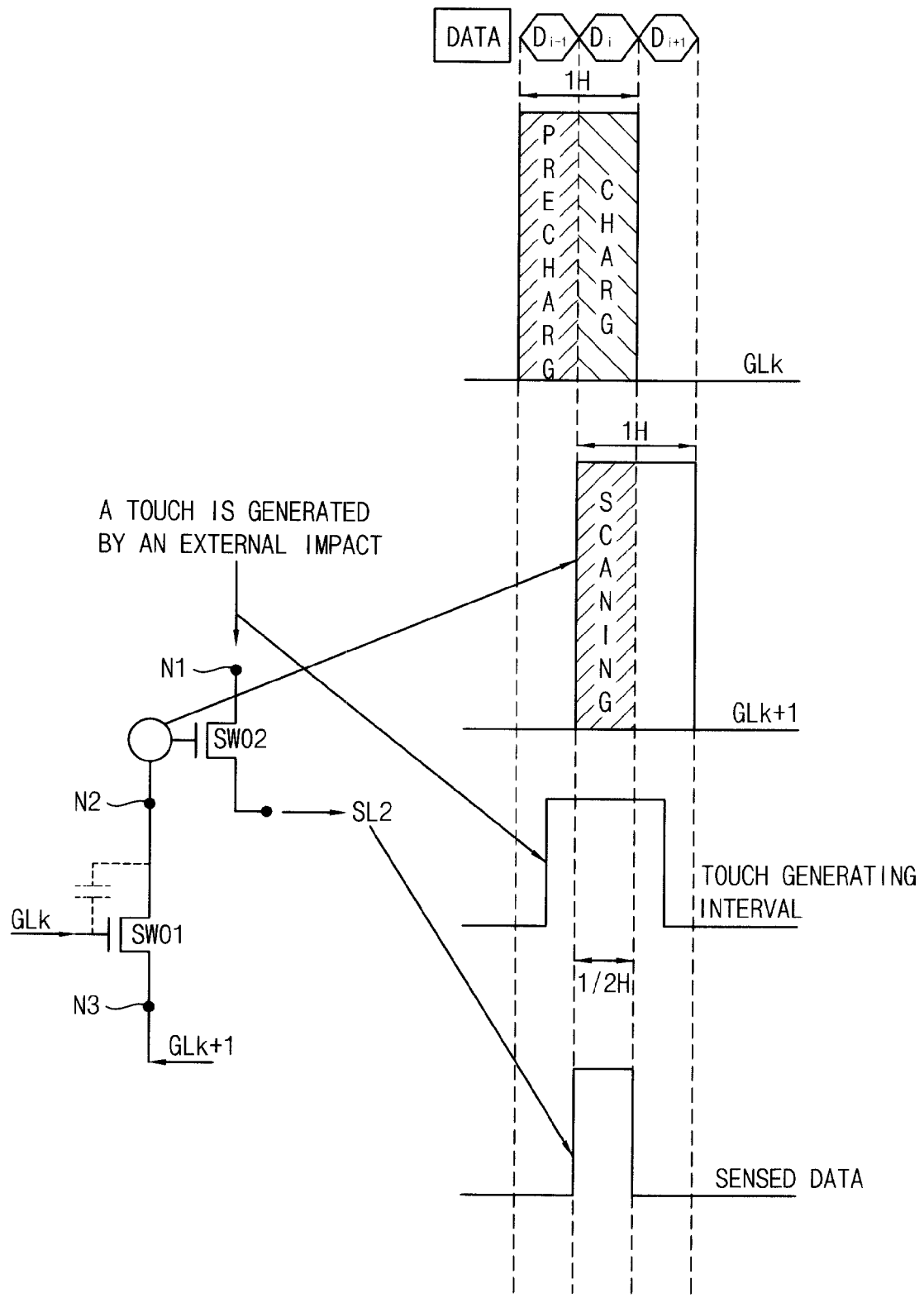
FIG. 13 depicts waveform diagrams showing the data signals, the gate signals and the touch signals when the LCD apparatus of FIG. 12A senses a touch operation.

FIG. 13 depicts waveform diagrams showing data signals, gate signals and touch signals when the LCD apparatus of FIG. 12A senses a touch operation. When an active signal for turning on a switching element 211 (shown in FIG. 1) connected to a pixel electrode is applied to a k-th gate line GLk, the first touch detection switching element SW01 is turned on for a ½ H interval. However, a voltage level of the (k+1)-th gate line GLk+1 is a low state, such that the second touch detection switching element SW02 is not turned on. In this case, even though a touch is generated by an external impact, a voltage level of the second sensing line SL2 is not varied.

Then, the first touch detection switching element SW01 is turned on for a ½H to 1H in which an active signal is applied to the k-th gate line GLk, and an active signal for turning on a switching element TFT connected to a pixel electrode is applied to the (k+1)-th gate line GLk+1, such that the second touch detection switching element SW02 is turned on. Thus, when an active signal is delivered to the second node N2 and a touch is generated by an external impact, the second sensing electrode ES2 and the third sensing electrode ES3 are electrically connected to each other such that a voltage level of the connection member 230 is applied to the sensing line SL2.

Then, the first touch detection switching element SW01 is turned off for a ½H to 1H in which an active signal is applied to the (k+1)-th gate line GLk+1, such that the second touch detection switching element SW02 is not turned on. Thus, even though a touch is generated by an external impact, a voltage level of the second sensing line SL2 is not varied.

Consequently, an interval capable of measuring a touch due to an external impact is a ½H interval during which an active signal is simultaneously applied to the gate line GLk and the (k+1)-th gate line GLk+1 to overlap with each other.

In the exemplary embodiment, it is described that the active signal applied to the k-th gate line GLk and the active signal applied to the (k+1)-th gate line GLk+1 overlap with each other for a ½H interval. Alternatively, the active signal applied to the k-th gate line GLk and the active signal applied to the (k+1)-th gate line GLk+1 may overlap with each other for an interval that is greater than a ½H interval or an interval that is smaller than a ½H interval. That is, an interval capable of measuring a touch due to an external impact may be an overlap interval.

According to exemplary embodiments of the present invention, in an LCD apparatus having a touch screen function, essential wirings for obtaining horizontal and vertical coordinates of a touch position may be reduced, such that a size of an area for the wirings may be decreased and light transmittance of the LCD apparatus can be increased. Therefore, display quality is enhanced and an additional process for forming the wiring is omitted, and manufacturing cost of the LCD apparatus can be decreased.

The foregoing is illustrative of the present invention and is not to be construed as limiting thereof. Although practical exemplary embodiments of the present invention have been described, those skilled in the art will readily appreciate that many modifications are possible in the exemplary embodiments without materially departing from the present invention and that such modifications to the disclosed exemplary embodiments, as well as other exemplary embodiments, are also intended to be included within the scope of the appended claims.

What is claimed is:

1. A liquid crystal display panel comprising:
    an array substrate comprising:
        a plurality of data lines;
        a plurality of gate lines that cross the data lines, a number of the gate lines being twice as many as a pixel resolution along a direction in which the data lines are formed;
        a pixel electrode connected to a data line and to a gate line to provide a respective pixel area;
        a plurality of sensing lines formed substantially parallel with the data lines; and
        a touch sensing circuit electrically connected to adjacent gate lines and the sensing lines, the adjacent gate lines being between the pixel electrodes adjacent to each other in a direction of the data lines;
    an opposite substrate opposite to the array substrate, the opposite substrate having connection members that protrude and are spaced apart from the array substrate by a predetermined interval; and
    a liquid crystal layer disposed between the array substrate and the opposite substrate,
    wherein the touch sensing circuit comprises:
        a first switching element comprising a first terminal electrically connected to a (k+1)-th gate line, 'k' being a natural number, the first switching element being turned on in response to a gate signal of a k-th gate line; and
        a second switching element configured to deliver a touch signal to one of the sensing lines, the second switching element being turned on in response to a signal from a second terminal of the first switching element.

2. The liquid crystal display panel of claim 1, wherein the touch sensing circuit further comprises:
    a first sensing electrode that electrically connects to a connection member when an external impact is applied to the connection member;
    a second sensing electrode electrically connected to the first sensing electrode; and
    a third sensing electrode separated from the first sensing electrode and the second sensing electrode and electrically connectable to the second sensing electrode;
    wherein the second switching element electrically connected to the second sensing electrode and to the third sensing electrode to switch between the second sensing electrode and the third sensing electrode in response to the signal of the second terminal of the first switching element.

3. The liquid crystal display panel of claim 2, wherein the sensing lines and the data lines are formed from a substantially same layer.

4. The liquid crystal display panel of claim 2, further comprising an interval maintaining member disposed between the array substrate and the opposite substrate to maintain a predetermined interval of the array substrate and the opposite substrate.

5. The liquid crystal display panel of claim 2, further comprising a common electrode formed on pixel areas and isolated from the pixel electrode by the liquid crystal layer,
    wherein the common electrode is electrically connected to the connection members such that a voltage potential of the common electrode is substantially equal to a voltage potential of the connection member.

6. The liquid crystal display panel of claim 2, wherein the first sensing electrode, the second sensing electrode, the third sensing electrode and the pixel electrode are formed from a substantially same layer.

7. The liquid crystal display panel of claim 2, wherein the first switching element and the second switching element each comprise a field effect transistor.

8. The liquid crystal display panel of claim 2, wherein the opposite substrate comprises a black matrix disposed between the pixel electrodes in a same direction as the data lines, the black matrix comprising an opaque material to prevent light leakage.

9. The liquid crystal display panel of claim 8, wherein the black matrix overlaps with the sensing lines.

10. A liquid crystal display apparatus comprising:
    a liquid crystal display panel comprising:
        an array substrate comprising:
            a plurality of data lines;
            a plurality of gate lines that cross the data lines, a number of the gate lines being twice as many as a pixel resolution along a direction in which the data lines are formed;

a pixel electrode connected to a data line and to a gate line to define a respective pixel area;

a plurality of sensing lines formed substantially parallel with the data lines; and a touch sensing circuit electrically connected to adjacent gate lines and the sensing lines, the adjacent gate lines being between the pixel electrodes adjacent to each other in a direction of the data lines;

an opposite substrate opposite to the array substrate, the opposite substrate having connection members that protrude and are spaced apart from the array substrate by a predetermined interval; and a liquid crystal layer disposed between the array substrate and the opposite substrate, a gate driver that sequentially outputs a plurality of gate signals to the gate lines such that portions of one horizontal period of adjacent gate signals overlap with each other; and a touch position detector that detects a position coordinate at which the external impact is applied, wherein the touch sensing circuit further comprises:

a first switching element comprising a first terminal electrically connected to a (k+1)-th gate line, 'k' being a natural number, the first switching element being turned on in response to a gate signal of a k-th gate line; and a second switching element configured to deliver a touch signal to one of the sensing lines, the second switching element being turned on in response to a signal from a second terminal of the first switching element.

11. The liquid crystal display apparatus of claim 10, further comprising:

a timing controller that receives a primary data signal and a control signal from an external device to control the liquid crystal display panel;

a power provider that outputs an initial driving voltage and an analog driving voltage to the liquid crystal display panel and that outputs a gate on/off voltage to the gate line, in response to a control signal output from the timing controller;

a gradation voltage generator that outputs a plurality of reference gradation voltages that correspond to a number of gradations using the analog driving voltage as a reference voltage provided from the power provider; and a data driver that converts the data signal provided in a line unit into a data voltage, based upon a control signal output from the timing controller and the gradation voltage output from the gradation voltage generator, and that outputs the data voltage to the data lines, wherein the gate driver generates the gate signal in response to a control signal output from the timing controller and a gate on/off voltage output from the power provider.

12. The liquid crystal display apparatus of claim 10, wherein the touch sensing circuit further comprises:

a first sensing electrode that electrically connects to the connection member when an external impact is applied thereto;

a second sensing electrode electrically connected to the first sensing electrode; and a third sensing electrode separated from the first sensing electrode and the second sensing electrodes and electrically connectable to the second sensing electrode;

wherein the second switching element electrically connected to the second sensing electrode and to the third sensing electrode to switch between the second sensing electrode and the third sensing electrode in response to the signal of the second terminal of the first switching element.

13. The liquid crystal display apparatus of claim 12, further comprising a common electrode isolated from the pixel electrode by the liquid crystal layer interposed between the common electrode and the pixel electrode, and wherein the common electrode is electrically connected to the connection member such that a voltage potential of the common electrode is substantially equal to a voltage potential of the connection member.

14. The liquid crystal display apparatus of claim 13, wherein voltages applied to the pixel electrodes are different from each other by frames with respect to a voltage potential of the common electrode.

15. The liquid crystal display apparatus of claim 12, wherein the gate driver is disposed within the liquid crystal display panel.

16. The liquid crystal display apparatus of claim 15, wherein the gate driver includes amorphous silicon.

17. The liquid crystal display apparatus of claim 16, wherein the gate driver is formed at two end portions of the liquid crystal display panel interposed between the two end portions.

18. The liquid crystal display apparatus of claim 12, wherein a period in which the adjacent gate signals overlap with each other is about one half a horizontal period.

19. A method of driving a liquid crystal display apparatus, the method comprising:

sequentially outputting a plurality of gate signals to a plurality of gate lines such that portions of one horizontal period of adjacent gate signals overlap with each other;

connecting a connection member that protrudes from an opposite substrate towards an array substrate to a first sensing electrode when an external impact is applied to an upper portion of an opposite substrate, the connection member being separated from an array substrate;

delivering a touch signal from the first sensing electrode to a sensing line during an overlapping interval in which the adjacent gate signals overlap with each other, when a touch is generated by the external impact; and detecting a position coordinate of a position to which the external impact is applied, wherein the first sensing electrode is in a touch detection sensing circuit, and wherein delivering the touch signal to the sensing line comprises:

delivering a touch signal to a second sensing electrode of the touch detection circuit electrically connected to the first sensing electrode;

delivering the touch signal delivered to the second sensing electrode through a switching element to the third sensing electrode of the touch detection circuit; and delivering the touch signal to the sensing line electrically connected to the third sensing electrode.

20. The method of claim 19, wherein, between the delivering the touch signal to the second sensing electrode and the delivering the touch signal to the third sensing electrode, the delivering the touch signal to the sensing line further comprises:

turning on a first switching element when an active signal is applied to a k-th gate line of the gate lines, 'k' being a natural number no more than the number of gate lines;

delivering an active signal of the (k+1)-th gate line from a first terminal of the first switching element to a second terminal of the first switching element; and turning on a second switching element connected to the second sensing electrode and the third sensing sensing electrode, when an active signal is applied to the second terminal of the first switching element.

* * * * *